(12) United States Patent
Kawai

(10) Patent No.: US 6,359,566 B2
(45) Date of Patent: Mar. 19, 2002

(54) WELDING MACHINES

(75) Inventor: Shingo Kawai, Aichi-ken (JP)

(73) Assignee: Nadex Co., Ltd., Nagoya (JP)

( * ) Notice: Subject to any disclaimer, the term of this patent is extended or adjusted under 35 U.S.C. 154(b) by 0 days.

(21) Appl. No.: 09/760,849

(22) Filed: Jan. 17, 2001

(30) Foreign Application Priority Data

Jan. 19, 2000 (JP) ........................................ 2000-010752

(51) Int. Cl.$^7$ ............................................. G08B 17/00
(52) U.S. Cl. .................... 340/589; 340/679; 219/86.41; 219/110; 434/234
(58) Field of Search ................................ 340/584, 589, 340/679; 219/132, 86.41, 109, 110; 434/234

(56) References Cited

U.S. PATENT DOCUMENTS

| | | | |
|---|---|---|---|
| 4,035,692 A | * 7/1977 | Luy et al. .................... 361/103 |
| 4,039,928 A | 8/1977 | Noftsker et al. | |
| 4,224,744 A | * 9/1980 | Siegel et al. ................. 434/234 |
| 4,608,482 A | * 8/1986 | Cox et al. .................... 219/132 |
| 4,847,471 A | * 7/1989 | Wallgren et al. ............. 219/497 |
| 5,376,766 A | * 12/1994 | Higgins ....................... 219/61.5 |
| 5,388,178 A | * 2/1995 | Moon .......................... 392/444 |
| 5,466,326 A | * 11/1995 | Cherney ....................... 156/359 |
| 5,708,253 A | * 1/1998 | Bloch et al. ............. 219/130.01 |
| 6,084,195 A | * 7/2000 | Swaggerty et al. ......... 219/86.41 |
| 6,124,793 A | * 9/2000 | Knutson ....................... 340/584 |

* cited by examiner

*Primary Examiner*—Benjamin C. Lee
(74) *Attorney, Agent, or Firm*—Dennison, Scheiner & Schultz

(57) ABSTRACT

Resistance welding machines may include one or more temperature sensors that measure the temperatures of one or more heat generating elements within the welding machine, such as the welding transformer, the welding cable, the welding gun and/or the welding current switching element. These heat generating elements generate heat due to the passage of the welding current and can be damaged if not properly cooled. A processor is provided to receive temperature signals from the temperature sensors(s) and actuate a warning output circuit when the temperature of one or more of the heat generating elements rises to a high temperature warning temperature. This high temperature warning temperature is preferably lower than an upper limit temperature at or above which the heat generating element may be damaged due to overheating.

4 Claims, 3 Drawing Sheets

WELDING MACHINES

BACKGROUND OF THE INVENTION

1. Field of the Invention

The present invention relates to welding machines and, more particularly, to welding machines used in automated production lines having temperature sensors coupled to heat generating elements of the welding machine and a controller for determining abnormal temperature conditions of the heat generating elements.

2. Description of the Related Art

Generally, resistance welding machines utilize a large current that passes through a welding gun, a welding cable, a welding transformer and a switching element for controlling a welding current. As a result, these heat generating elements generate heat and typically a cooling device is utilized in the resistance welding machine in order to cool such heat generating elements using water or another cooling medium.

However, if the cooling device malfunctions, the heat generating elements may rise in temperature and may be damaged or destroyed by the excessive heat. In order to protect the heat generating elements from thermal damage, a protective system against excessive heating is typically provided. For example, a bimetal temperature sensitive switch is disposed on each of the heat generating elements and is actuated when the temperature of the associated heat generating element rises to a specified temperature, which temperature is usually a temperature at which parts within the welding machine may be damaged. Thus, if the temperature of any of the heat generating elements, such as the welding transformer, rises to a specified temperature and the bimetal temperature-sensitive switch is actuated during the welding operation, a controller sends a signal to the switching element in order to turn off the welding current.

The temperature of the heat generating elements may excessively increase, thereby actuating the bimetal temperature-sensitive switch, in the following representative situations:

1) the current exceeds a predetermined rated current for the particular heat generating element,
2) the cooling device malfunctions, e.g. due to improper operation or the cooling medium freezes,
3) calcium, magnesium, sand, rust, dust or another (insulating) material is deposited within the cooling device, thereby reducing the ability of the cooling device to conduct heat from the heat generating elements or
4) microorganisms propagate in the cooling water and deposit within the cooling device, thereby clogging the cooling device with such deposits.

Resistance welding machines are typically installed in production lines for vehicle bodies or other similar products. If the bimetal temperature-sensitive switch is actuated during operation because an excessive temperature situation is detected, the welding current is cut off. As a result, the welding operation cannot be continued and the production line must be stopped. In this case, the production line cannot be operated again until the cause of the excess temperature rise is determined and eliminated. Therefore, productivity of the production line may be severely affected.

SUMMARY OF THE INVENTION

It is, accordingly, an object of the present teaching to teach improved welding machines.

In one aspect of the present teachings, the welding machine has a device that provides a warning if a heat generating element is approaching an excessive temperature. In this case, an operator is informed of the potentially excessive temperature rise before the temperature of the heat generating element rises pass an upper limit temperature at or above which the welding current is cut off. Thus, remedial action can be taken while the welding machine and the production line is still operating and the problem can be corrected without stopping the production line. Thus, the present welding machines significantly improve productivity over known welding machines.

According to another aspect of the present teachings, the welding machine has an indicator that indicates temperatures of heat generating elements that generate heat due to passage of the welding current. If the temperature indicator indicates a warning signal, the operator can track down and eliminate the cause of a temperature rise of any of the heat generating elements before the temperature of the heat generating element reaches its upper limit temperature.

In another aspect of the present teachings, welding machines may include a memory that is adapted to store data concerning the history of the temperatures of the heat generating elements. A display, a printer or other displaying means may be provided to display the temperature history of one or more heat generating elements. In this case, the operator can study the time-varying temperature conditions of a particular heat generating element in order to assist in determining the cause of a potentially excessive temperature situation.

According to another aspect of the present teachings, the welding machine has a warning device that generates a warning when the temperature of any of the heat generating elements has risen to a potentially excessive temperature, which warning temperature is preferably lower than an upper limit temperature at which the welding current will be shut off. Because the warning device notifies the operator that the temperature of one or more of the heat generating elements has reached the warning temperature, the operator is given early notice of a potential problem. Therefore, the operator can promptly eliminate the cause of the temperature rise of the heat generating element before an excessive temperature situation has occurred. In this case, the warning device may be constructed to operate in a manner that will permit the operator to identify the particular heat generating element that has risen to the warning temperature.

In another aspect of the present teachings, the welding machine has a warning device that provides a warning when the temperature of one or more of the heat generating elements rises by at least a specified amount within a predetermined period of time. Because the operator is notified by the warning device that the temperature of one or more of the heat generating elements has rapidly risen, the operator is notified at an early time of the possibility that the temperature of one or more of the heat generating elements may reach its upper limit temperature in the near future. Again, in this case, the operator can take remedial action at an early time, thereby avoiding a work stoppage.

Additional objects, features and advantages of the present invention will be readily understood after reading the following detailed description together with the accompanying drawings and the claims.

DETAILED DESCRIPTION OF THE INVENTION

Figure 1:
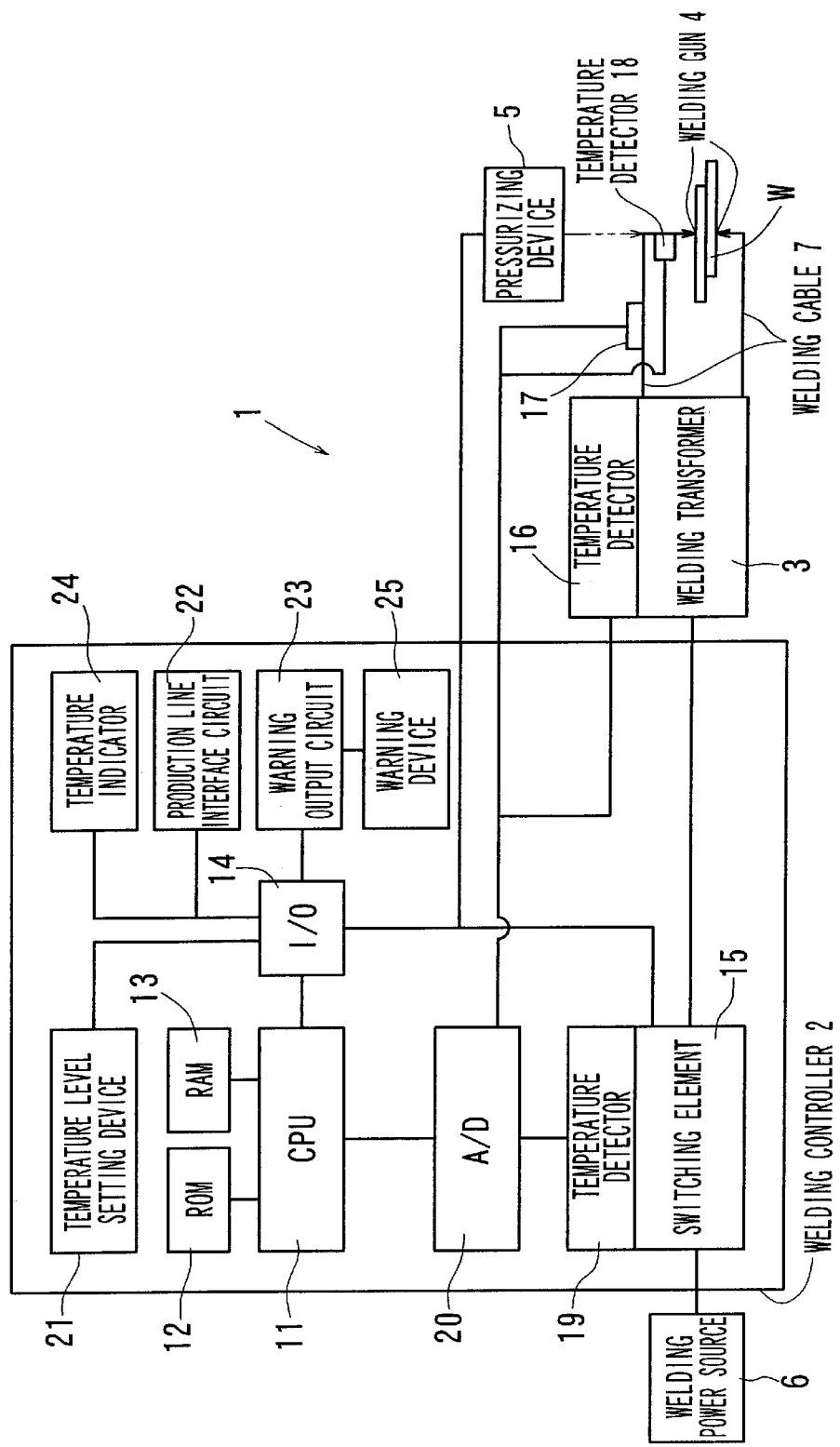
FIG. 1 is a block diagram of a representative resistance welding machine.

Generally, a welding operation is stopped when the temperature of a heat generating element that generates heat by passage of a welding current rises to an upper limit temperature at or above which overheating may damage the heat generating element. In this specification, any device or part within the resistance welding machine that conducts current and can rise to an excessive temperature is commonly referred to as a heat generating element. However, if the welding operation is stopped, the production line also will stop and thus the productivity of the production line is decreased. In order to prevent such stoppage of the welding operation, welding machines of the present teachings are capable of providing a warning temperature that is lower than the upper limit temperature at which the welding current will be shut off and the production line stopped.

Representative welding machines may include a temperature measuring device (temperature sensor) that is adapted to detect the temperature(s) of heat generating element(s) within the welding machine. An indicator also is preferably coupled to the temperature sensor in order to indicate the temperature of the heat generating elements. As a result, the operator can track down and eliminate the cause of a potentially excessive temperature rise of any of the heat generating elements before the temperature of the heat generating element reaches its upper limit temperature. Therefore, problems can be corrected before an excessive temperature situation is reached.

The welding machine may also include a memory for storing a history of the temperatures of the heat generating elements. The memory may be coupled to a display means that displays the temperature history stored in the memory. Therefore, the operator can study the time-varying temperature conditions of each of the heat generating elements by checking the temperature history of the heat generating element using the display means. As a result, the operator can analyze or predict when the temperatures of the heat generating elements will rise and can promptly take remedial action in order to prevent an excessive temperature rise of the heat generating elements.

In another representative embodiment of the present teachings, the welding machine may also have a warning device in order to warn the operator of a potential problem. For example, a temperature measuring device (temperature sensor) may be coupled to one or more heat generating elements that generate heat due to passage of the welding current. A warning device may be provided to warn the operator when the temperature of any of the heat generating elements has risen to a warning temperature. Preferably, the warning temperature is less than an upper limit temperature at which the welding current will be cut off to protect the welding machine from damage. In this embodiment, the warning device gives a warning when the temperature of one or more of the heat generating elements reaches the warning temperature. Thus, the operator is promptly notified that the temperature of one or more of the heat generating elements has reached the warning temperature. Therefore, the operator can track down and eliminate the cause of a temperature rise of the heat generating element before the temperature of the heat generating element reaches its upper limit temperature. As a result, the welding machine can be prevented from stopping due to an excessive temperature rise of the particular heat generating element.

Preferably, in this case, the warning device may be constructed to operate in a manner to permit the operator to identify the particular heat generating element that has risen to the warning temperature. Thus, based upon the operating condition of the warning device, the operator can readily identify the particular heat generating element that may become a problem. Therefore, the operator can promptly track down and eliminate the cause of the temperature rise of the particular heat generating element that may have a problem.

However, if the temperature of one of the heat generating elements is increasing rapidly, the heat generating element may still reach the upper limit (excessive) temperature, even if the warning is promptly provided when the temperature of the heat generating element has reached the warning temperature. Thus, in another representative embodiment of the present teachings, the welding machine may have a temperature measuring device for measuring temperatures of the heat generating elements. A warning device may provide a warning when the temperature of any of the heat generating elements has risen by at least specified amount within a predetermined period of time. In this case, the warning may be provided much earlier than if the warning device waits to provide the warning until the warning temperature has been reached. Therefore, the operator is notified by the warning device that the temperature of one or more of the heat generating elements has risen rapidly and the operator will be given prompt notice of the possibility that the temperature of one or more of the heat generating elements may soon reach its upper limit temperature. Consequently, even if the temperature of any of the heat generating elements has risen rapidly, the welding machine can be promptly fixed and it is not necessary to stop the production line due to the rapid temperature rise of one or more of the heat generating elements.

Each of the additional features and constructions disclosed above and below may be utilized separately or in conjunction with other features and constructions to provide improved welding machines. Representative examples of the present invention, which examples utilize many of these additional features and constructions in conjunction, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and constructions disclosed in the following detail description may not be necessary to practice the invention in the broadest sense, and are instead taught merely to particularly describe some representative examples of the invention.

FIG. 1 is a block diagram showing a representative resistance welding machine 1 that may be installed, for example, in a vehicle body production line. As shown in FIG. 1, resistance welding machine 1 may include a welding controller 2, a welding transformer 3, a welding gun 4, a pressurizing device 5, a welding power source 6 and a welding cable 7. Welding gun 4 clamps a workpiece W. Pressurizing device 5 applies pressure to the workpiece W clamped by welding gun 4. Welding power source 6 supplies current for welding the workpiece W. Welding cable 7 electrically connects welding transformer 3 to welding gun 4.

Welding controller 2 preferably includes a central processing unit (CPU) 11, a read-only memory (ROM) 12, a random access memory (RAM) 13, and an input/output interface 14. CPU 11 may be programmed to execute various controlling operations based on a welding control program that is stored in ROM 12 and welding control data that is stored in RAM 13. For example, CPU 11 controls pressurizing device 5 that applies pressure to the workpiece W and also controls a switching element 15, such as a transistor, which conducts an AC voltage having a predetermined frequency to the primary side of welding transformer 3.

When current is supplied to the primary side of welding transformer 3, current is supplied from the secondary side of welding transformer 3 to welding gun 4 via welding cable 7. As a result, a welding current passes through the workpiece W that is press-clamped with welding gun 4 and thus the workpiece W is welded.

The welding current that passes through the workpiece W press-clamped by welding gun 4 is generally a large current on the order of 10,000 A. Accordingly, a large amount of heat is generated in welding transformer 3, welding cable 7, welding gun 4 and switching element 15 (i.e. the heat generating elements) due to this large current. Therefore, a cooling device (not shown) is preferably provided in resistance welding machine 1. The cooling device cools each of the heat generating elements, such as welding transformer 3, welding cable 7, welding gun 4 and switching element 15, to thereby protect the same from damage caused by excessive temperatures.

Further, as shown in FIG. 1, temperature detectors 16, 17, 18, 19 may be coupled to the heat generating elements, such as welding transformer 3, welding cable 7, welding gun 4 and switching element 15, respectively. Temperature detectors 16 to 19 may preferably include a temperature detecting element such as a thermistor or other temperature sensor. Various types of appropriate temperature sensors are known in the art and need not be specifically described.

Temperature detector 16 detects the temperature of welding transformer 3 and transmits an analog signal corresponding to the detected temperature to an A/D converter 20. Temperature detector 17 detects the temperature of welding cable 7 and transmits an analog signal corresponding to the detected temperature to A/D converter 20. Temperature detector 18 detects the temperature of welding gun 4 and transmits an analog signal corresponding to the detected temperature to A/D converter 20. Temperature detector 19 detects the temperature of switching element 15 and transmits an analog signal corresponding to the detected temperature to A/D converter 20. A/D converter 20 may preferably include a multiplexor (MUX) (not shown) in order to serially process the analog temperature signals.

A/D converter 20 converts the analog signals transmitted from temperature detectors 16 to 19 into digital signals and transmits the digital signals to CPU 11. Thus, CPU 11 is supplied with data concerning the temperatures of welding transformer 3, welding cable 7, welding gun 4 and switching element 15.

A temperature level setting device 21 may be included in welding controller 2 in order to permit the operator to set the warning temperature and the upper limit temperature for welding transformer 3, welding cable 7, welding gun 4 and switching element 15. The upper limit temperature of each of the heat generating elements may be set to a temperature at or above which the heat generating element may be damaged or destroyed due to overheating. When the temperature of any of the heat generating elements rises to its upper limit temperature, CPU 11 may immediately cut off the welding current and output an abnormal condition signal by means of production line interface circuit 22 to a controller (not shown) that controls the vehicle body production line in which resistance welding machine 1 is installed. If the abnormal condition signal is generated, the production line controller will stop the production line and indicate the stoppage of the production line on an indicator.

The warning temperature of each of the heat generating elements is preferably set to a lower temperature than the upper limit temperature. Naturally, the warning temperature will be higher than the normal operating temperatures. As discussed above, the warning temperature is preferably chosen in order to notify the operator that the temperature of one or more of the heat generating elements may reach the upper limit temperature if remedial action is not taken. If the temperature of any of the heat generating elements rises to its warning temperature, CPU 11 will output a warning signal from a warning output circuit 23 and actuate a warning device 25, such as a beeper or a lamp. When the warning device 25 is activated, the operator is notified to start investigating the cause of the temperature rise of the heat generating element. Preferably, a plurality of warning devices 25 may be used in order to provide a separate warning device 25 for each particular heat generating element. In this case, the operator can easily identify the particular heat generating element that has risen to its warning temperature.

A temperature indicator 24 also may be provided in welding controller 2 in order to indicate the temperatures of the various heat generating elements based on temperature indicating signals outputted from CPU 11.

Figure 2:
FIG. 2 is a graph showing a pattern of welding currents supplied to the resistance welding machine.

FIG. 2 shows a representative welding current pattern of resistance welding machine 1 that is installed in a vehicle body production line. In a typical automated production line, the vehicle body is welded at several portions (five in FIG. 2) in one welding process. A representative method of using resistance welding machine 1 will now be explained with reference to FIGS. 2 and 3.

Figure 3:
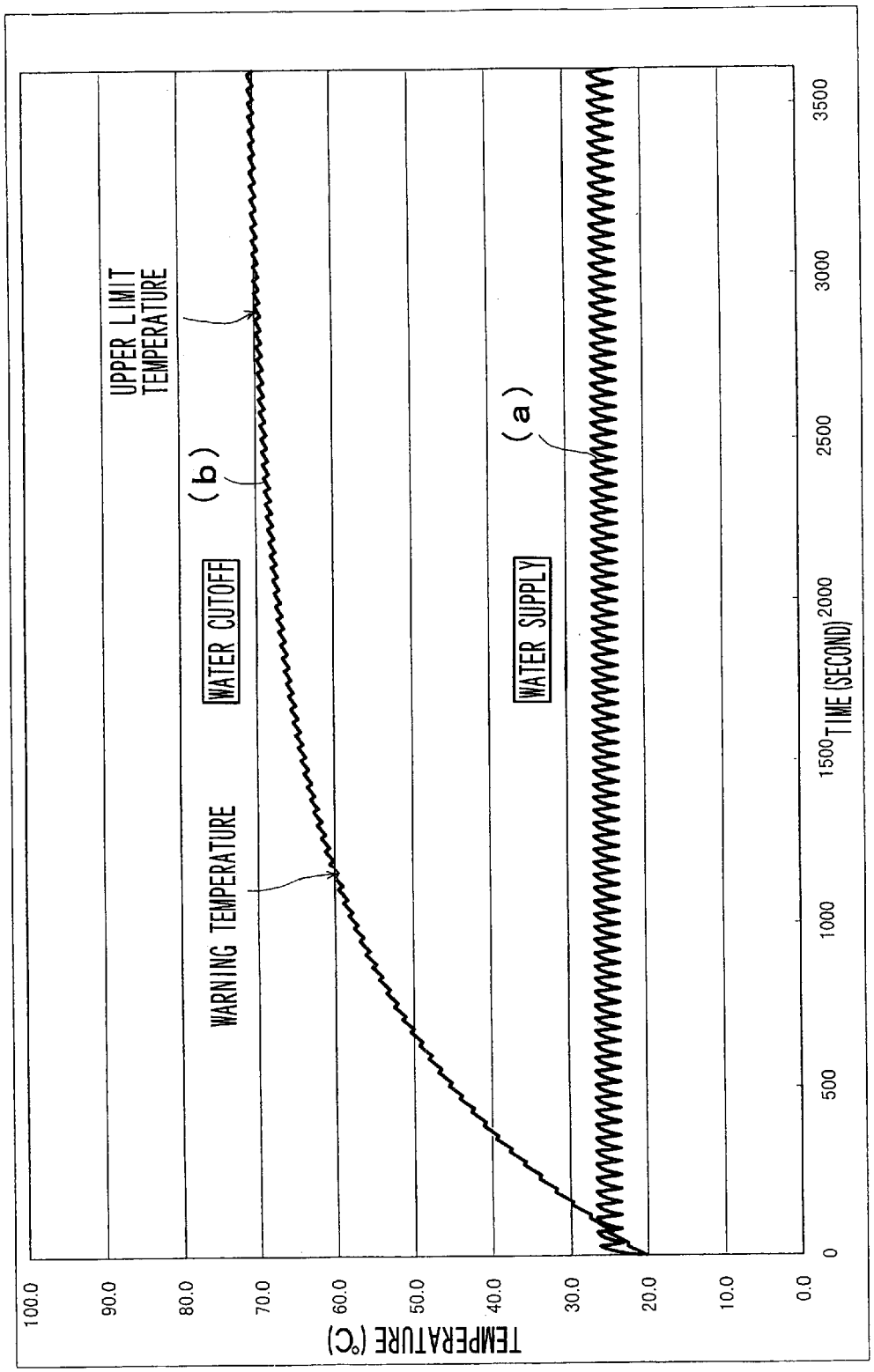
FIG. 3 is a graph showing the temperature change of a representative heat generating element within the resistance welding machine.

When resistance welding machine 1 utilizes the welding current pattern shown in FIG. 2, the temperature of each of the heat generating element changes as shown in FIG. 3. FIG. 3 shows an average temperature change of the heat generating elements of resistance welding machine 1.

In FIG. 3, temperature pattern (a) shows the temperature change of the heat generating elements under usual operating conditions in which a proper amount of cooling water is being supplied from the cooling device to the heat generating elements. On the other hand, temperature pattern (b) shows the temperature change of the heat generating elements in a case in which the supply of the cooling water has been stopped, for example, due to mishandling of a valve. In this case, the heat generating elements will only be air-cooled.

In some abnormal situations, the heat generating element may have intermediate temperature pattern between the temperature patterns (a) and (b). For example, intermediate temperature patterns will be seen in the case of conditions (3) or (4) noted above in the Description of the Related Art.

As clearly seen from the temperature pattern shown in FIG. 3, if the warning temperature is set appropriately (i.e. 60° C. in FIG. 3), a relatively long time is provided before the temperature of the heat generating element reaches the upper limit temperature (i.e. 70° C. in FIG. 3), even though the heat generating element is only air-cooled and the temperature of the heat generating element has risen to the warning temperature. Thus, the cause of the potentially excessive temperature rise can be investigated and eliminated when the temperature of the heat generating element has reached the warning temperature but before the upper limit temperature is reached. Therefore, the temperature of the heat generating element can be prevented from reaching the upper limit temperature without stopping the production line.

In this embodiment, when the temperature of any of the heat generating elements reaches the warning temperature, CPU 11 outputs a warning signal from warning output circuit 23 and activates the warning device 25, such as a beeper or a lamp. With such warning, the operator can readily recognize that the temperature of the heat generating element has reached the warning temperature. Thus, the operator can immediately start to investigate and determine the cause of the temperature rise of the heat generating element and can eliminate such cause before the temperature of the heat generating element reaches an upper limit temperature. Therefore, the problem can be fixed without stopping the production line and thus the productivity of the production line can be improved.

Temperature detectors 16 to 19 detect the temperatures of the heat generating elements and CPU 11 can indicate the detected temperatures on temperature indicator 24 in real time. Therefore, the operator can readily see from the indication of the temperature indicator 24 whether the temperature of each of the heat generating elements has reached its warning temperature.

CPU 11 also can store a history of the temperatures of the heat generating elements in RAM 13, which temperatures have been detected by temperature detectors 16 to 19. Further, CPU 11 can graphically indicate the temperature histories of the heat generating elements that are stored in RAM 13 on temperature indicator 24. Based upon this graphic indication, the operator can recognize the time period in which the thermal allowance of each of the heat generating elements becomes the smallest. The operator can also analyze the cause of any abnormal temperature increases in the heat generating elements.

Further, CPU 11 can detect the highest temperature, the lowest temperature and the average temperature of each of the heat generating elements and indicate the detected temperatures on temperature indicator 24. The operator can determine the thermal allowance of each of the heat generating elements from the highest temperature of each of the heat generating elements that is indicated on temperature indicator 24. Further, the operator can recognize a possibility of freezing of the cooling water from the lowest temperature of each of the heat generating elements that is indicated on temperature indicator 24. Additionally, the operator can determine the average thermal allowance of each of the heat generating elements from the average temperature of each of the heat generating elements that is indicated on temperature indicator 24.

Further, CPU 11 can calculate the temperature increase rate of each of the heat generating elements within a predetermined period of time. If the calculated temperature increase rate exceeds a specified value, CPU 11 can also output a warning signal from warning output circuit 23 and activate a beeper, a lamp or a similar warning device 25. With such warning, the operator is promptly informed of a sharp increase of the temperature of one or more of the heat generating elements. Therefore, in the event of a sharp increase of the temperature of one or more of the heat generating elements, the operator can immediately investigate and eliminate the cause of such abnormal heating before the temperature of the heat generating element reaches its upper limit temperature.

Naturally, the above-mentioned functions of CPU 11 may be utilized separately or in combination.

Although a resistance welding machine having a cooling device has been described, the present invention can be also utilized with resistance welding machines that do not have a cooling device. Further, the present invention can be also applied to welding machines other than resistance welding machines.

What is claimed is:

1. A welding machine comprising:

a temperature sensor coupled to a heat generating element within the welding machine that generates heat due to passage of a welding current, a controller adapted to control the welding current and to receive data from the temperature sensor and generate a warning signal, wherein the warning signal is generated when the temperature of the heat generating element rapidly rises within a period of time and a warning device coupled to the controller and adapted to actuate when the warning signal is received.

2. A welding machine comprising:

a temperature sensor coupled to a heat generating element within the welding machine that generates heat due to passage of a welding current, a controller adapted to execute a program that controls the welding current and generates (i) a temperature signal and (ii) a high temperature warning signal, (iii) an upper limit temperature signal and (iv) a rapid temperature increase warning signal based upon data from the temperature sensor, wherein the controller is further adapted to cut off the welding current when the temperature of the heat generating element rises to the upper limit temperature at or above which the heat generating element may be damaged by overheating, a memory coupled to the controller, wherein the memory is adapted to store a history of the temperatures of the heat generating element, an indicator adapted to display the temperature signal from the controller and the history of temperatures of the heat generating element stored in the memory, a warning device coupled to the controller and adapted to actuate when the controller generates the high temperature warning signal, wherein the high temperature warning temperature is lower than the upper limit temperature.

3. A welding machine as in claim 2, further comprising a plurality of temperature sensors coupled to a plurality of heat generating elements and wherein the controller is further adapted to identify the particular heat generating element that has risen to the high temperature warning temperature.

4. A welding machine as in claim 2, wherein the controller is further adapted to generate the rapid temperature increase warning signal when the temperature of the heat generating element rapidly rises within a period of time, wherein the warning device is adapted to actuate when the rapid temperature increase warning signal is generated.

* * * * *